United States Patent
Omura et al.

(10) Patent No.: US 9,311,949 B2
(45) Date of Patent: Apr. 12, 2016

(54) MAGNETIC POWDER AND METHOD OF MANUFACTURING THE SAME

(71) Applicant: FUJIFILM Corporation, Minato-ku, Tokyo (JP)

(72) Inventors: Kazufumi Omura, Minami-ashigara (JP); Masahiko Mori, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/755,395

(22) Filed: Jun. 30, 2015

(65) Prior Publication Data

US 2015/0302880 A1 Oct. 22, 2015

Related U.S. Application Data

(62) Division of application No. 13/661,964, filed on Oct. 26, 2012, now Pat. No. 9,117,581.

(30) Foreign Application Priority Data

Oct. 28, 2011 (JP) ................................. 2011-236602

(51) Int. Cl.
C22B 1/14 (2006.01)
G11B 5/842 (2006.01)
G11B 5/706 (2006.01)
H01F 1/11 (2006.01)

(52) U.S. Cl.
CPC ............ G11B 5/842 (2013.01); G11B 5/70678 (2013.01); H01F 1/11 (2013.01)

(58) Field of Classification Search
CPC .................................. C05B 19/00; C22B 1/14
USPC ....................................................... 23/313 R
See application file for complete search history.

(56) References Cited

U.S. PATENT DOCUMENTS

| 6,677,036 B2 | 1/2004 | Noguchi et al. |
| 2003/0143323 A1 | 7/2003 | Noguchi et al. |

FOREIGN PATENT DOCUMENTS

| JP | 61-250831 A | 11/1986 |
| JP | 01-232530 A | 9/1989 |
| JP | 03-116414 A | 5/1991 |
| JP | 05-299217 A | 11/1993 |
| JP | 08-183618 A | 7/1996 |
| JP | 2003-132531 A | 5/2003 |

OTHER PUBLICATIONS

Office Action dated Mar. 4, 2014 in Japanese Application No. 2011-236602.
Office Action dated Oct. 1, 2013 in Japanese Application No. 2011-236602.

*Primary Examiner* — Edward Johnson
(74) *Attorney, Agent, or Firm* — Sughrue Mion, PLLC

(57) ABSTRACT

An aspect of the present invention relates to a method of manufacturing magnetic powder, which comprises adding an alkali metal salt compound comprising a substituent selected from the group consisting of an alkali metal salt of a carboxyl group and an alkali metal salt of a hydroxyl group to a water-based magnetic liquid comprising magnetic particles dispersed in an acidic water-based solvent to cause the magnetic particles to aggregate in the water-based magnetic liquid; and collecting the aggregated magnetic particles to obtain the magnetic powder.

9 Claims, No Drawings

MAGNETIC POWDER AND METHOD OF MANUFACTURING THE SAME

CROSS-REFERENCE TO RELATED APPLICATIONS

This is a Divisional of application Ser. No. 13/661,964, filed Oct. 26, 2012 which claims the benefit of priority under 35 USC 119 to Japanese Patent Application No. 2011-236602 filed on Oct. 28, 2011, the disclosures of which are incorporated herein by reference in their entirety.

BACKGROUND OF THE INVENTION

1. Field of the Invention

The present invention relates to magnetic powder, a method of manufacturing the same, and the usage thereof. More specifically, the present invention relates to magnetic powder modified so as to enhance dispersion in an organic solvent-based magnetic layer-forming coating liquid, a method of manufacturing the same, and the usage thereof.

2. Discussion of the Background

In recent years, the means of rapidly transmitting information have undergone considerable development, permitting the transmission of data and images containing immense amounts of information. With this improvement in data transmission technology has come the demand for higher density recording in recording media and recording and reproduction devices for recording, reproducing, and storing information. The high dispersion of microparticulate magnetic powder and increased smoothing of the surface of the magnetic layer to reduce spacing loss are known to be effective ways of achieving good electromagnetic characteristics in the high-density recording region.

Widely employed methods of enhancing the dispersion of magnetic powders include, for example, the method of incorporating a polar group such as a $SO_3Na$ group into a binder that is described in Japanese Unexamined Patent Publication (KOKAI) No. 2003-132531 or English language family members US2003/143323 A1 and U.S. Pat. No. 6,677,036, which are expressly incorporated herein by reference in their entirety, and the method of using a dispersing agent as an additive during the manufacturing of a magnetic layer-forming coating liquid as described in Japanese Unexamined Patent Publication (KOKAI) Heisei No. 1-232530, which is expressly incorporated herein by reference in its entirety.

As described in Japanese Unexamined Patent Publication (KOKAI) No. 2003-132531, incorporating polar groups into a binder is an effective means of enhancing dispersion. Conversely, when the number of polar groups introduced into the binder is excessive, dispersion may decrease. Additionally, dispersing agents such as those described in Japanese Unexamined Patent Publication (KOKAI) Heisei No. 1-232530 adsorb to the surface of magnetic particles and enhance compatibility between the magnetic particles, binder, and solvent, thereby improving dispersion of the magnetic particles in the magnetic layer-forming coating liquid. However, even when a microparticulate magnetic powder of small primary particle diameter is employed, the microparticles of the magnetic powder aggregate strongly, and end up being added to the magnetic layer-forming coating liquid as a coarse aggregate. Unless a powerful dispersion load is applied to break down the aggregated state of the magnetic powder, the dispersing agent does nothing but cover the surface of the aggregate. As a result, the magnetic powder ends up being present in the form of a coarse aggregate in the magnetic layer that is formed, precluding the achievement of good surface smoothness. It would also be conceivable to intensify the dispersing conditions to break down the aggregate formed by the powerful aggregation of microparticles of magnetic powder. However, when that is done, abrasion of the dispersion medium causes foreign matter to mix into the medium and damages the magnetic powder, undesirably presenting the possibility of compromising magnetic characteristics.

SUMMARY OF THE INVENTION

An aspect of the present invention provides for means for readily forming a magnetic layer in which magnetic powder is present in a highly dispersed state.

The present inventors conducted extensive research, resulting in the following discoveries.

Magnetic particles develop a positive surface charge in acidic water-based solvents because protons adsorb onto the magnetic particles. Thus, the repulsive force between positive charges enables the existence of a high state of dispersion. Accordingly, were it possible to cause a dispersing agent such as that described in Japanese Unexamined Patent Publication (KOKAI) Heisei No. 1-232530 to adsorb to the surface of the magnetic particles, it would conceivably be possible to cover the surface of the magnetic particles in a state, not of a coarse aggregate, but of microparticulate magnetic powder.

However, use in organic solvent-based magnetic layer-forming coating liquids is envisioned for the dispersing agents that have conventionally been employed. Thus, they have poor solubility in water-based solvents. Accordingly, even when added to water-based solvents, they tend not to cover the surface of the magnetic particles. The present inventors conducted further extensive research in this regard, noting that among compounds that have conventionally been employed as dispersing agents in magnetic layer-forming coating liquids, those compounds containing carboxyl groups (—COOH) or hydroxyl groups (—OH), despite having poor solubility in water in the form of protic compounds, exhibited better solubility in water when the carboxyl groups or hydroxyl groups were present in the form of an alkali metal salt. Accordingly, when the present inventors added a carboxyl group or hydroxyl group-containing compound in the form of an alkali metal salt compound to a water-based magnetic liquid containing magnetic particles dispersed in an acidic water-based solvent, aggregation of the magnetic particles in the water-based magnetic liquid was observed. However, the aggregate was unexpectedly readily broken down in an organic solvent-based magnetic layer-forming coating liquid. In this regard, the present inventors presumed that the alkali metal salt compound that adsorbed to the surface of the magnetic particles in the acidic water-based magnetic liquid was converted into a protic compound and the solubility thereof decreased, thereby forming the aggregate. They also presumed that the reason why the aggregate could be readily broken down in an organic solvent-based magnet layer-forming coating liquid was that the protic compound dissolved readily in organic solvents. The fact that the magnetic particles aggregated after adhesion of the alkali metal salt compound in the water-based magnetic liquid was an advantage in that the magnetic particles the surfaces of which had been modified by the compound could be readily collected by solid-liquid separation.

The present invention was devised based on the above knowledge.

An aspect of the present invention relates to a method of manufacturing magnetic powder, which comprises:

adding an alkali metal salt compound comprising a substituent selected from the group consisting of an alkali metal salt of a carboxyl group and an alkali metal salt of a hydroxyl group to a water-based magnetic liquid comprising magnetic particles dispersed in an acidic water-based solvent to cause the magnetic particles to aggregate in the water-based magnetic liquid; and collecting the aggregated magnetic particles to obtain the magnetic powder.

In an embodiment, a compound the protic compound of which is of weaker acidity than acid contained in the acidic water-based solvent is employed as the alkali metal salt compound.

In an embodiment, the alkali metal salt compound that has been adhered to a surface of the magnetic particles converts into a protic compound, resulting in the aggregation of the magnetic particles in the water-based magnetic liquid.

In an embodiment, the alkali metal salt compound is an aromatic compound having the substituent.

In an embodiment, the alkali metal salt compound is selected from the group consisting of an alkali metal salt compound of cinnamic acid and an alkali metal salt compound of dihydroxynaphthalene.

A further aspect of the present invention relates to magnetic powder manufactured by the above manufacturing method.

A still further aspect of the present invention relates to a method of manufacturing a magnetic recording medium, which comprises:

manufacturing magnetic powder by the above manufacturing method;

dispersing the magnetic powder that has been manufactured together with an organic solvent and a binder to prepare a magnetic coating material; and forming a magnetic layer with the magnetic coating material that has been prepared.

A still further aspect of the present invention relates to a magnetic recording medium manufactured by the above manufacturing method.

The present invention can provide a magnetic recording medium in which microparticulate magnetic powder is dispersed to a high degree, affording good electromagnetic characteristics.

Further, since dispersion of the microparticulate magnetic powder is facilitated, the dispersion load on the magnetic particles in the manufacturing process can be greatly reduced.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a method of manufacturing magnetic powder, which comprises:

adding an alkali metal salt compound comprising a substituent selected from the group consisting of an alkali metal salt of a carboxyl group and an alkali metal salt of a hydroxyl group to a water-based magnetic liquid comprising magnetic particles dispersed in an acidic water-based solvent to cause the magnetic particles to aggregate in the water-based magnetic liquid; and collecting the aggregated magnetic particles to obtain the magnetic powder.

The present invention further provides the magnetic powder obtained by the above method.

In the magnetic recording medium, the fact that the magnetic particles are present in the form of microparticles in the magnetic layer relates to enhancing electromagnetic characteristics. Thus, to enhance electromagnetic characteristics, it is desirable for microparticulate magnetic particles to be present in the magnetic layer in a highly dispersed state. To that end, in the magnetic layer-forming coating liquid, it is desirable to disperse the microparticulate magnetic particles to a high degree. Through the above steps in the present invention, despite aggregating in the water-based magnetic liquid, it is possible to obtain a magnetic powder comprised of magnetic particles that can be readily dispersed to a high degree in an organic solvent-based magnetic layer-forming coating liquid. Accordingly, by subjecting the microparticulate magnetic powder to the above steps, it is possible to obtain magnetic powder that is capable of forming a magnetic layer in which a microparticulate magnetic powder is dispersed to a high degree.

The method of manufacturing magnetic powder of the present invention will be described more specifically below.

Preparation of Water-Based Magnetic Liquid

The above "water-based magnetic liquid" refers to a liquid in which magnetic particles are in a state of dispersion, without precipitation or aggregation, to a degree where separation of the solid phase and liquid phase cannot be determined visually. One embodiment (referred to as the "first embodiment", hereinafter), can be obtained by simultaneously or sequentially admixing the water-based solvent, magnetic particles (also referred to as the "starting material magnetic particles", hereinafter), and an acid component. From the perspective of suitability to the formation of a high-density recording-use magnetic recording medium, the starting material magnetic particles desirably have an average primary particle size of equal to or less than 35 nm.

In this context, the average primary particle size of the magnetic particles is a value measured by the following method.

The magnetic particles are photographed at 100,000-fold magnification with a model H-9000 transmission electron microscope made by Hitachi and printed on photographic paper at an overall magnification of 500,000-fold to obtain a particle photograph. The targeted magnetic particles are selected in the particle photograph, the contours of the particles are traced with a digitizer, and the particle size is measured with KS-400 Carl Zeiss image analysis software. The size of 500 primary particles is measured. The term "primary particle" refers to an independent particle that has not aggregated. The arithmetic average of the particle size as measured by this method is adopted as the average primary particle size of the magnetic particles.

From the perspective of achieving stable magnetization without thermal fluctuation, the average primary particle size is desirably equal to or more than 10 nm. From the perspective of achieving both stable magnetization and high density recording, the average primary particle size desirably falls within a range of 10 to 35 nm, preferably within a range of 20 to 35 nm. However, even when the starting material magnetic particles are microparticles, when they are present in the magnetic layer as aggregates, each aggregate behaves like a coarse particle, making it difficult to improve the electromagnetic characteristics. Accordingly, to form a magnetic layer in which the magnetic particles are dispersed to a high degree in the present invention, the surface of the magnetic particles is subjected to a modifying treatment (surface-modifying treatment) with a prescribed alkali metal salt compound in a water-based solvent as set forth further below. This treatment is described further below.

In the present invention, the size of the particles or powder of magnetic particles or the like (referred to as the "particle size", hereinafter), (1) is given by the length of the major axis of the particle, that is, the major axis length when the particles are acicular, spindle-shaped, cylindrical in shape (with the height being greater than the maximum major diameter of the bottom surface), or the like; (2) is given by the maximum major diameter of the plate surface or bottom surface when the particles are tabular or cylindrical in shape (with the thickness or height being smaller than the maximum major diameter of the plate surface or bottom surface); and (3) is given by the diameter of a circle of equal perimeter when the particles are spherical, polyhedral, or of indeterminate shape, and the major axis of the particle cannot be specified based on the shape. The term "diameter of a circle of equal perimeter" can be obtained by circular projection.

The average particle size of the particles is the arithmetic average of the above particle size and is obtained by measuring 500 primary particles, as set forth above.

Examples of starting material magnetic particles that can be employed in the first embodiment are the various ferromagnetic particles that are generally employed in the magnetic layer of a magnetic recording medium, such as hexagonal ferrite magnetic particles and ferromagnetic metal magnetic particles.

Examples of the water-based solvent are solvents comprising water as principal component, including water and mixed solvents of water and a water-soluble organic solvent such as methanol, ethanol, acetone, N,N-dimethylformamide, N,N-dimethylacetamide, and tetrahydrofuran.

The acid component can be either an organic or inorganic acid. Examples of inorganic acids that can be employed are hydrochloric acid, sulfuric acid, nitric acid, boric acid, and phosphoric acid. Examples of organic acids are amino acids, acetic acid, glycolic acid, and diglycolic acid. Of these, the use of acetic acid is desirable from the perspective of ease of handling, and the use of hydrochloric acid, a strong acid, is desirable from the perspective of being able to adjust the pH with just a small quantity. The magnetic particles can be dispersed to a high degree in the water-based magnetic liquid by imparting an adequate positive charge to the surface of the magnetic particles. From this perspective, the quantity of acid employed is desirably one that is adequate to adjust the water-based magnetic liquid to equal to or lower than pH 5, and preferably one that is adequate to adjust it to equal to or lower than pH 4. Since there are cases where the surface of the magnetic particles will dissolve under strongly acidic conditions, the above pH is desirably equal to or higher than 3.

The water-based magnetic liquid can be obtained by simultaneously or sequentially admixing, and desirably stirring, a water-based solvent, starting material magnetic particles, and an acid component. To enhance the magnetic characteristics of the magnetic particles, the step of dispersing the magnetic particles in the acidic water-based solvent (the dispersion treatment in the acidic water-based solvent and the recovery of the solid component by solid-liquid separation) is desirably conducted multiple times. The acid treatment is for removing foreign matter that compromises magnetic characteristics from the surface of the particles. This point will be described in greater detail. For example, there are cases where a glass component will remain when not completely removed by the acid treatment from hexagonal ferrite magnetic particles obtained by the glass crystallization method set forth further below. Such a residual glass component will sometimes compromise the magnetic characteristics of the magnetic particles. Repeatedly conducting dispersion in an acidic water-based solvent will dissolve and remove glass components from the surface of the particles. In an aqueous slurry containing charged particles, the concentration of the electrolyte (ion concentration) is known to affect the dispersion/aggregation state. When the electrolyte concentration is low, the electric double layer around the charged particles widens, a counter force is exerted to prevent stacking of the electric double layer, and the charged particles tend to disperse without precipitating. Conversely, when a large quantity of an ionic component is present in the aqueous slurry, the ionic balance within the system collapses, dispersion stabilization due to the electric double layer is impeded, and the magnetic particles precipitate relatively quickly. Accordingly, the more foreign matter that has dissolved and ionized due to the dispersion treatment in the acidic water-based solvent, the greater the ionic component that will be present in the system, thereby reducing the dispersion stability of the magnetic particles. The smaller the quantity of foreign matter becomes, the more stable the dispersion of the magnetic particles and the less they tend to precipitate. From this perspective, it is desirable to repeat the dispersion treatment in the acidic water-based solvent a number of times that is adequate to ensure that the magnetic particles do not tend to precipitate. This can be done as a countermeasure to remove foreign matter from the surface of the magnetic particles and to enhance the magnetic characteristics of the magnetic particles. It is also desirable to repeat the dispersion treatment in the acidic water-based solvent to cause the surface-modifying agent to cover the surface of the magnetic particles that have been dispersed to a high degree.

On the other hand, a glass crystallization method is a method of manufacturing hexagonal ferrite magnetic particles widely employed as the magnetic powder for magnetic recording media. In general, the glass crystallization method comprises the steps of (1) melting a starting material mixture containing glass-forming components and hexagonal ferrite-forming components, (2) rapidly cooling and solidification, (3) heat treating the solidified product (causing hexagonal ferrite crystals to precipitate), (4) treating the solidified product with an acid (to remove the glass component by dissolution), and (5) cleaning with a water-based solvent. In step (4), a water-based magnetic liquid necessarily containing magnetic particles (hexagonal ferrite magnetic particles) is obtained because step (4) is generally conducted in an acidic water-based solvent. The water-based magnetic liquid that is obtained will normally be in a dispersed state from which hexagonal ferrite magnetic particles do not precipitate. Since it is difficult to collect the magnetic particles in a dispersed state and conduct the subsequent step of washing step (5), an aggregating agent (such as ammonium oxalate) is normally employed to cause them to aggregate. However, in the present invention, the dispersed state can be utilized to conduct a surface-modifying treatment with an alkali metal salt compound, described further below, on the water-based magnetic liquid obtained in acid treatment step (4). That is, the present invention also includes an embodiment (also referred to as "the second embodiment", hereinafter) in which the water-based magnetic liquid is obtained during the process for obtaining hexagonal ferrite magnetic particles by the glass crystallization method, specifically, during the acid treatment step in the glass crystallization method. The known glass crystallization techniques described in Japanese Unexamined Patent Publication (KOKAI) Nos. 2010-282671, 2010-235411, 2010-080608, which are expressly incorporated herein by reference in their entirety, and the like can be applied to the above step of the glass crystallization method in the second embodiment.

Surface-Modifying Treatment with Alkali Metal Salt Compound

In the present invention, an alkali metal salt compound, comprising a substituent selected from the group consisting of an alkali metal salt of a carboxyl group and an alkali metal salt of a hydroxyl group, is added to the water-based magnetic liquid obtained in the above-described first embodiment or second embodiment. Alkali metal salts of various carboxyl group-containing compounds and hydroxyl group-containing compounds (referred to hereinafter as "proton-type compounds" or "protic compounds") that are employed as dispersing agents in organic solvent-based magnetic layer coating liquids can be employed as the alkali metal salt compound. As set forth above, the proton-type compound has poor solubility in water-based solvents, but can exhibit high solubility in water-based solvents when in the form of an alkali metal salt. Accordingly, the above alkali metal salt compound can be added to a water-based solution to dissolve it. In this context, when the water-based solution that dissolves the alkali metal salt compound is a water-based magnetic liquid in which magnetic particles are highly dispersed by the repulsive force between positive charges as set forth above, it becomes possible to cover the surface (modify the surface) of the magnetic particles in the form of microparticulate magnetic material, and not a coarse aggregate, with the alkali metal salt compound. As set forth above, the alkali metal salt compound covering the surface of the magnetic particles is presumed to be converted into a protic compound with poor solubility in water-based solvents in the acidic water-based solution, and is thought to be why an aggregate of magnetic particles would form in the water-based magnetic liquid. However, the aggregate that forms here can break down ready in organic solvents. That is attributed to the good solubility (compatibility) of the protic compound adhering to the surface of the magnetic particles with organic solvents. Further, breaking down the aggregate as set forth above makes it possible to disperse the magnetic particles in a microparticulate state in the organic solvent. That is, in the present invention, an alkali metal salt compound can be caused to adhere to the surface of magnetic particles dispersed in a microparticulate state in a water-based solution, this compound can be converted into a protic compound, magnetic particles can be obtained in which the protic compound is adhered to them in a microparticulate state (with the presence of the protic compound causing the magnetic particles to aggregate), and the aggregate can be broken down in an organic solvent. It is thought that by means of the above mechanism, the magnetic particles can be readily dispersed in microparticulate form in the organic solvent.

The above "alkali metal salt compound" refers to a compound having one or more substituents in the form of —COOM and —OM (wherein M denotes an alkali metal atom; identical below). A compound in which the carboxyl group of a carboxyl group-containing compound that is known as a dispersing agent in magnetic layers is present as —COOM or an alkali metal salt compound of a hydroxyl group-containing compound that is known as a dispersing agent in magnetic layers is desirably employed. Examples of alkali salt metal compounds that are desirable from the above perspective are compounds comprising an aromatic ring such as a naphthalene skeleton or benzene skeleton onto which has been directly substituted, or indirectly substituted through a linking group, a substituent selected from the group consisting of —COOM and —OM. Examples of the linking group are divalent linking groups such as —C—, —C=C—, and —O—, and divalent linking groups comprising combinations of two or more of the above. Examples of alkali metal salt compounds that are preferred from the perspective of their dispersion-enhancing effect in organic solvents and on solubility in water-based magnetic liquids are alkali metal salt compounds of cinnamic acid and alkali metal salt compounds of dihydroxynaphthalene. At least one, and optionally two or more, substituents that are contained in the above alkali metal salt compound are selected from the group consisting of —COOM and —OM. Other substituents such as carboxyl groups, hydroxyl groups, and alkyl groups can be contained in the alkali metal salt compound in addition to the above substituent. The quantity of the alkali metal salt compound that is added to the water-based magnetic liquid in which magnetic particles are dispersed in an acidic water-based solvent can be 0.1 to 10 weight parts per 100 weight parts of magnetic particles, and can be 0.0001 to 5 weight parts per 100 weight parts of the total weight of the water-based magnetic liquid. The above ranges are desirable to facilitate the obtaining of a magnetic powder that is highly dispersible in organic solvents. Conducting stifling during and/or following addition of the alkali metal salt compound to the water-based magnetic liquid is desirable to cause the alkali metal salt compound to dissolve and uniformly adhere to the surface of the magnetic particles.

As set forth above, the phenomenon of the magnetic particles aggregating when the alkali metal salt compound is added to the water-based magnetic liquid has been observed. The present inventors presume this to be due to the conversion of the —COOM to —COOH and —OM to —OH (conversion to protic compounds) in the alkali metal salt compound that has adhered to the surface of the magnetic particles, thereby diminishing the solubility of the compound. As set forth above, inducing aggregation affords an advantage by facilitating collection by solid-liquid separation of the magnetic particles that have been surface-modified with the compound. To promote this aggregation, it is desirable to rapidly convert the alkali metal salt compound that has been adhered to the surface of the magnetic particles to a protic compound. From the perspective of facilitating the above conversion, a compound the protic compound of which is of weaker acidity than the acid contained in the acidic water-based solvent is desirably employed as the alkali metal salt compound. The use of an alkali metal salt compound the protic compound of which has a pKa in a water-based solution (25° C.) of water:tetrahydrofuran=4:6 (volumetric ratio) larger than the pKa of the acid by about 0.1 to about 8 is preferred.

The aggregate of the magnetic particles formed in the water-based magnetic liquid will precipitate, so the supernatant can be removed and they can be collected from the water-based solvent. The aggregate of magnetic particles that is collected can be washed by decantation or the like in an aqueous solution that has been, as needed, adjusted to a weakly acidic to neutral pH by adding a base, and then conducting a drying process to obtain dry powder. In the second embodiment, the step of obtaining a magnetic powder after the surface-modifying treatment can be conducted in the same manner as the washing step in the usual glass crystallization method, or using a process based on it. In both the first and second embodiments, a magnetic powder can be obtained in the form of an aggregate of magnetic particles in this manner. However, as set forth above, the aggregate can be readily broken down in an organic solvent, achieving a highly dispersed state in a magnetic layer-forming magnetic coating material without increasing the dispersion load.

The method of manufacturing a magnetic recording medium of the present invention will be described below.

The method of manufacturing a magnetic recording medium of the present invention comprises:

manufacturing magnetic powder by the method of manufacturing magnetic powder of the present invention;

dispersing the magnetic powder that has been manufactured together with an organic solvent and a binder to prepare a magnetic coating material; and forming a magnetic layer with the magnetic coating material that has been prepared.

The present invention can also provide a magnetic recording medium manufactured by the above method.

The method of manufacturing magnetic powder of the present invention is conducted in a water-based solvent. When a magnetic coating material containing the water-based solvent is employed to form a magnetic layer, the magnetic layer that is formed becomes hydrophilic. Thus, there is a concern of plasticization or the like due to moisture absorption. Accordingly, a magnetic coating material with an organic solvent system is employed to form the magnetic layer in the method of manufacturing a magnetic recording medium of the present invention. In this context, the term "organic solvent" means a non-water-based organic solvent; trace amounts of moisture of a degree that does not cause problems such as plasticization in the magnetic coating material are permitted.

Examples of the organic solvent that is employed in the magnetic coating material are those organic solvents that are generally employed to prepare particulate magnetic recording media. Specific examples thereof are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio. Among them, from the perspectives of the solubility of the binders that are commonly employed in magnetic recording media and adsorption of binder onto the surface of the magnetic particles, the use of an organic solvent containing a ketone (ketone-based organic solvent) is desirable.

These organic solvents need not be 100 percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. To improve dispersion properties, a solvent having a somewhat strong polarity is desirable. It is desirable that solvents having a dielectric constant equal to or higher than 15 are comprised equal to or higher than 50 weight percent of the solvent composition. Further, the dissolution parameter is desirably 8 to 11.

The magnetic powder that is subjected to dispersion in the organic solvent is obtained as an aggregate of magnetic particles, as set forth above. In the aggregate, the protic compound of the alkali metal salt compound is presumed to adhere to the surface of the particles. The protic compound is highly compatible with organic solvents. Thus, the aggregate can be broken down by the usual dispersion treatment that is conducted to form a magnetic layer to readily obtain a magnetic coating material containing highly dispersed magnetic particles without generating a high dispersion load.

Specific embodiments of the method of manufacturing a magnetic recording medium of the present invention will be described below.

Magnetic Layer

The magnetic layer in the present invention can be a layer containing a binder and the magnetic particles released by breaking down the aggregate of the magnetic powder subjected to the treatment set forth above.

Examples of the binder for use in the magnetic coating material employed for the formation of magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

Additives can be added to the magnetic layer as needed. Examples of additives are abrasives, lubricants, dispersing agents, dispersion adjuvants, antifungal agents, antistatic agents, oxidation-inhibiting agents, and carbon black. Commercial products can be suitably selected for use based on the desired properties of the additives. Use of a protic compound of the above alkali metal salt compound is effective to further enhance dispersion. That is because dispersion can be further improved by causing the protic compound exhibiting a dispersion-enhancing effect to adhere to the magnetic particles that are highly dispersed in the organic solvent.

Nonmagnetic Layer

Details of the nonmagnetic layer will be described below. In the present invention, a nonmagnetic layer comprising nonmagnetic powder and a binder can be formed between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0039] in Japanese Unexamined Patent Publication (KOKAI) No. 2010-24113 for details thereof.

Binders, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the nonmagnetic layer. Reference can be made to paragraphs [0040] to [0042] in Japanese Unexamined Patent Publication (KOKAI) No. 2010-24113 for details thereof.

Nonmagnetic Support

The magnetic coating material that has been prepared by the above method is coated directly, or through another layer such as a nonmagnetic layer, on the nonmagnetic support. As a result, a magnetic recording medium having the magnetic layer on the nonmagnetic support, or as needed, through another layer such as a nonmagnetic layer can be obtained.

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in the present invention desirably ranges from 3 to 10 nm.

Layer Structure

As for the thickness structure of the magnetic recording medium obtained by the present invention, the thickness of the nonmagnetic support desirably ranges from 3 to 80 µm. The thickness of the magnetic layer can be optimized based on the saturation magnetization of the magnetic head employed, the length of the head gap, and the recording signal band, and is normally 10 to 150 nm, desirably 20 to 120 nm, and preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 µm, desirably 0.3 to 2.0 µm, and preferably, 0.5 to 1.5 µm in thickness. The nonmagnetic layer of the magnetic recording medium of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat Layer

A backcoat layer can be provided on the surface of the nonmagnetic support opposite to the surface on which the magnetic layer are provided, in the present invention. The backcoat layer desirably comprises carbon black and inorganic powder. The formula of the magnetic layer or nonmagnetic layer can be applied to the binder and various additives for the formation of the backcoat layer. The backcoat layer is preferably equal to or less than 0.9 µm, more preferably 0.1 to 0.7 µm, in thickness.

Manufacturing Process

With the exception that the magnetic powder obtained by the method of manufacturing magnetic powder of the present invention is employed, the coating liquid (magnetic coating material) for forming the magnetic layer is prepared by the same method as that used to prepare an ordinary magnetic layer coating liquid.

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the magnetic particle, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads and other beads may be employed to disperse the magnetic layer, nonmagnetic layer and backcoat layer coating liquids. Dispersing media with a high specific gravity such as zirconia beads, titania beads, and steel beads are suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

The present invention can form a magnetic layer in which magnetic particles are highly dispersed. Thus, the present invention can provide a high-density recording-use magnetic recording medium that exhibits good electromagnetic characteristics.

EXAMPLES

The present invention will be described in detail below based on examples. However, the present invention is not limited to the examples. The terms "parts" and "percent" given in Examples are weight parts and weight percent.

Example 1

To 100 parts of the following barium ferrite magnetic powder were added 200 parts of water, after which the aqueous solution containing the magnetic particles was dispersed by processing in a sand mill. One hundred parts of the dispersion were collected, 110 parts of 30% acetic acid aqueous solution were added, and the mixture was stirred for 2 hours at 84° C. The stirring was stopped, the product was separated into barium ferrite magnetic powder precipitate and supernatant, and 130 parts of the supernatant were removed. Two hundred liters of 98° C. water were added and the mixture was stirred for 5 minutes. Subsequently, the mixture was left standing for 1.5 hours and 160 parts of supernatant were removed. Nine parts of 1N hydrochloric acid and 140 parts of 98° C. water were added, the mixture was stirred for 1 hour, and the mixture was left standing for 3 hours. One part of 1N hydrochloric acid was added and the mixture was stirred for 30 minutes, yielding an aqueous dispersion (water-based magnetic liquid) in which barium ferrite magnetic powder had been readily dispersed to a high degree without precipitating. To the aqueous dispersion obtained were added dropwise 10 parts of 0.25 mol/L sodium cinnamate aqueous solution and the mixture was stirred for 30 minutes, causing the magnetic particles to aggregate and precipitate. Subsequently, the mixture was left standing, the supernatant was removed, and a precipitate was obtained. To the precipitate obtained were added 150 parts of water. A 10% NaOH aqueous solution was added to adjust the pH to 5 to 7 while stirring the solution, allowing it to stand, and removing the supernatant. This cycle was conducted a total of equal to or more than 10 times. The barium ferrite magnetic powder obtained was filtered and dried for 40 hours at 120° C. to obtain a dry magnetic powder (an aggregate of magnetic particles).

Barium Ferrite Magnetic Powder
Composition excluding oxygen (molar ratio): Ba/Fe/Co/Zn=1/9/0.2/1
Hc: 176 kA/m (2,200 Oe)
Average plate diameter: 25 nm
Average plate ratio: 3
Specific surface area by BET method: 65 $m^2/g$
σs: 49 $A·m^2/kg$ (49 emu/g)
pH: 7

Preparation of Magnetic Coating Material and Test to Confirm Ease of Dispersion

In a solution of 3.3 weight parts of cyclohexanone, 4.9 weight parts of methyl ethyl ketone (2-butanone), and 0.033 weight part of oleic acid were suspended 2.2 weight parts of the magnetic powder prepared in Example 1 and 1 weight part of polyurethane resin. To the suspension were added 27 weight parts of zirconia beads 0.5 mm in diameter (made by Nikkato) and the suspension was dispersed. Portions of the magnetic coating material were collected at specific times from the start of dispersion and the diameter of the dispersed particles was measured by the method set forth below.

(Method of Measuring Diameter of Dispersed Particles)

The magnetic coating material was diluted to a solid component concentration of 0.2 weight % with a mixed solution containing cyclohexanone and methyl ethyl ketone in a volumetric ratio of 6.0 cyclohexanone to 9.0 methyl ethyl ketone (the "solid component" denotes the total weight of the magnetic powder and polyurethane).

The average particle diameter of the magnetic powder in the diluted solution as measured with an LB-500 dynamic light scattering particle size distribution analyzer made by HORRIBA was adopted as the dispersed particle diameter. The smaller the diameter of the dispersed particles, the better the dispersion without aggregation of the magnetic powder indicated.

Example 2

With the exception that the 10 parts of 0.25 mol/L sodium cinnamate aqueous solution were replaced with 10 parts of 0.25 mol/L sodium 2,3-dihydroxynaphthalene (2,3-dihydroxynaphthalene salt in which one of the two hydroxyl groups had been replaced with "—ONa"), a dry powder was obtained by the same operation as in Example 1.

A 2.2 weight part quantity of the magnetic powder obtained was employed to prepare a magnetic coating material and conduct a confirmation test of the ease of dispersion by the same methods as in Example 1.

Measurement of pKa

Cinnamic acid, 2,3-dihydroxynaphthalene, and hydrochloric acid were weighed out in 60 mg quantities each and dissolved in a mixed solved comprised of water:THF=4:6 (volumetric ratio). Factor-calibrated 0.1N sodium hydroxide was employed in neutralization titration, and the solution drip quantity [mL] was read at the neutralization point on the titration curve. The pH at half the solution drip quantity was adopted as the pKa of each of the above compounds. The pKa values measured were: cinnamic acid: 6.50, 2,3-dihydroxynaphthalene: 10.4, hydrochloric acid: 2.59.

Comparative Example 1

With the exception that the 10 parts of 0.25 mol/L sodium cinnamate aqueous solution were not employed, a dry powder was obtained by the same operation as in Example 1.

A 2.2 weight part quantity of the magnetic powder obtained was employed to prepare a magnetic coating material and conduct a confirmation test of the ease of dispersion by the same methods as in Example 1.

The results of the ease of dispersion confirmation tests conducted as set forth above are given in Table 1 below.

TABLE 1

|  | Dispersion time | |
| --- | --- | --- |
|  | 6 hours | 9 hours |
| Example 1 | 60 nm | 53 nm |
| Example 2 | 45 nm | 39 nm |
| Comparative Example 1 | 64 nm | 64 nm |

Compared to Comparative Example 1, Examples 1 and 2 had smaller dispersed particle diameters for the same dispersion time. Thus, it was determined that a magnetic coating material containing magnetic particles in a highly dispersed state could be obtained without applying a high dispersion load in the present invention. Using the magnetic coating material thus obtained, it was possible to form a magnetic layer in which magnetic particles were highly dispersed, and thus obtain a magnetic recording medium affording excellent electromagnetic characteristics.

The present invention is useful in the field of manufacturing magnetic recording media for high-density recording, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a magnetic recording medium, which comprises:
    manufacturing magnetic powder by a manufacturing method comprising:
    adding an alkali metal salt compound comprising a substituent selected from the group consisting of an alkali metal salt of a carboxyl group and an alkali metal salt of a hydroxyl group to a water-based magnetic liquid comprising magnetic particles dispersed in an acidic water-based solvent to cause the magnetic particles to aggregate in the water-based magnetic liquid; and
    collecting the aggregated magnetic particles to obtain the magnetic powder;
    dispersing the magnetic powder that has been manufactured together with an organic solvent and a binder to prepare a magnetic coating material; and
    forming a magnetic layer with the magnetic coating material that has been prepared.

2. The method of manufacturing a magnetic recording medium according to claim 1, wherein a compound the protic compound of which is of weaker acidity than acid contained in the acidic water-based solvent is employed as the alkali metal salt compound.

3. The method of manufacturing a magnetic recording medium according to claim 1, wherein the alkali metal salt compound that has been adhered to a surface of the magnetic particles converts into a protic compound, resulting in the aggregation of the magnetic particles in the water-based magnetic liquid.

4. The method of manufacturing a magnetic recording medium according to claim 1, wherein the alkali metal salt compound is an aromatic compound having the substituent.

5. The method of manufacturing a magnetic recording medium according to claim 2, wherein the alkali metal salt compound is an aromatic compound having the substituent.

6. The method of manufacturing a magnetic recording medium according to claim 3, wherein the alkali metal salt compound is an aromatic compound having the substituent.

7. The method of manufacturing a magnetic recording medium according to claim 1, wherein the alkali metal salt compound is selected from the group consisting of an alkali metal salt compound of cinnamic acid and an alkali metal salt compound of dihydroxynaphthalene.

8. The method of manufacturing a magnetic recording medium according to claim 2, wherein the alkali metal salt compound is selected from the group consisting of an alkali metal salt compound of cinnamic acid and an alkali metal salt compound of dihydroxynaphthalene.

9. The method of manufacturing a magnetic recording medium according to claim 3, wherein the alkali metal salt compound is selected from the group consisting of an alkali metal salt compound of cinnamic acid and an alkali metal salt compound of dihydroxynaphthalene.

* * * * *